United States Patent Office 2,839,682
Patented June 17, 1958

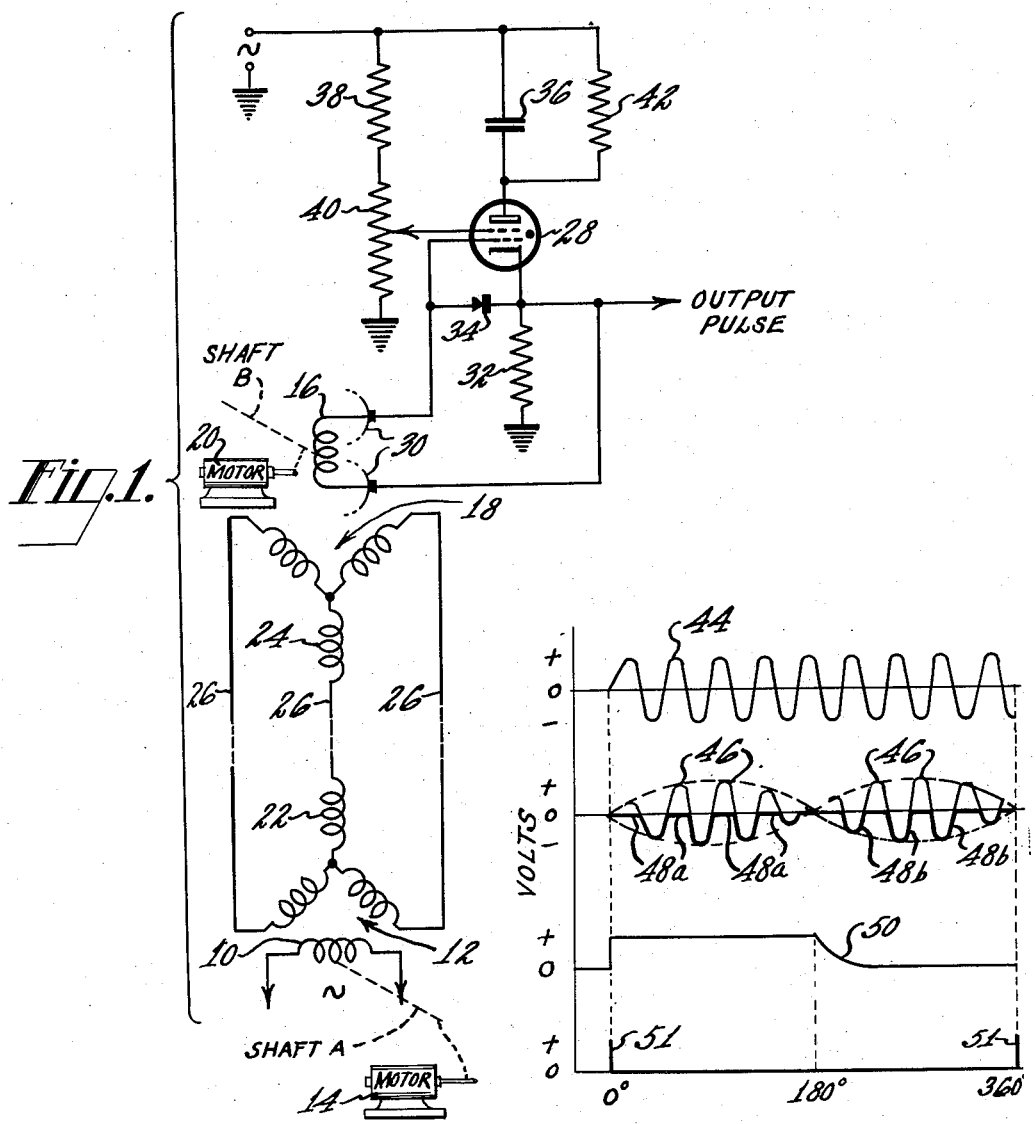

2,839,682

NULL DETECTOR

William E. Woods, Haddonfield, N. J., assignor, by mesne assignments, to the United States of America as represented by the Secretary of the Navy Application October 31, 1955, Serial No. 543,912

11 Claims. (Cl. 250—27)

This invention relates to null detectors, and more particularly to apparatus for indicating zero angular rotational displacement between two shafts whose angular rotational relationship increases in one direction with time. The null detector of the present invention is particularly applicable for indicating a direction, such as north, on search radar displays. Another application of the present invention may be to provide sensitive position control in industrial automation processes.

Null detectors are in common use in the electronic arts to indicate when a variable voltage equals, or passes through, a predetermined voltage. When such null detectors of the prior art are adapted to indicate zero angular rotational displacement between two rotating shafts, however, they usually employ a plurality of tubes and relatively complex circuitry.

Accordingly, it is an object of the present invention to provide an improved null detector for indicating the instant of zero angular rotational displacement between two shafts whose angular rotational relationship increases in one direction with time.

It is another object of the present invention to provide an improved null detector that comprises a relatively simple circuit which is responsive to a desired null and which is adapted to suppress an anti-null.

Still another object of the present invention is to provide an improved null detector that is suitable for use in search radar display apparatus, and in industrial automation applications.

A further object of the present invention is to provide an improved null detector that is relatively simple in construction and operation, easy and economical to manufacture, and highly efficient in use.

In accordance with the present invention, the foregoing objects and related advantages are attained in an improved null detector comprising a pair of synchro control transformers connected in a manner to provide a modulated voltage wave whose amplitude passes through zero when the angular rotational displacement of the rotor of one of the synchro control transformers is either at 0° or 180° with respect to the rotor of the other synchro control transformer. A gas tube, such as a thyratron, is supplied with an operating voltage comprising an alternating current (A.-C.) voltage of a predetermined frequency. The rotor of one of the synchro control transformers is also excited with an A.-C. voltage of the same frequency. The rotor of the other synchro control transformer is connected between the control grid and the cathode of the thyratron. The thyratron is connected in a circuit to rectify the operating A.-C. voltage only when the angular rotational displacement between the rotor of one of the synchro control transformers is less than 180° with respect to the rotor of the other synchro control transformer. A capacitor connected to the anode and a resistor connected to the cathode comprise a differentiator circuit for producing a single sharp pulse at the cathode at the instant of zero angular rotational displacement between the two rotors. Although the thyratron continues to be triggered at the frequency of the A.-C. voltage when the angular rotational displacement between the two rotors is between 0° and 180°, the succeeding current pulses through the thyratron are made negligibly small because of a resistor connected in shunt with the capacitor to provide a relatively long time constant, that is, relatively longer than the period of one cycle of the aforementioned A.-C. voltage. Thus, an output pulse is derived from the cathode of the thyratron only when the relative angular rotational displacement between the two rotors of the synchro transformers is 0°.

The novel features of the present invention, as well as the invention itself, both as to its organization and method of operation, will be understood in detail from the following description when considered in connection with the accompanying drawing in which:

Fig. 1 is a schematic diagram of a null detector in accordance with the present invention; and Fig. 2 is a diagram of waveforms used to explain the operation of the null detector of Fig. 1.

Referring now to Fig. 1, there is shown an improved null detector, in accordance with the present invention, for detecting 0° angular rotational displacement between a rotatable shaft A and a rotatable shaft B. The shaft A is fixed to a rotor 10 of a synchro control transformer 12, in a manner whereby the rotor 10 will rotate with the shaft A. Rotating means, such as a motor 14, is mechanically coupled to the shaft A to rotate the shaft A about its axis. Shaft B is fixed to a rotor 16 of a synchro control transformer 18 in a manner whereby the rotor 16 will rotate with the shaft B. Rotating means, such as a motor 20, is mechanically coupled to the shaft B for rotating the latter about its axis. The stator 22 of the synchro control transformer 12 is connected to the stator 24 of the synchro control transformer 18, as by the three-wire transmission line 26, in a manner whereby any magnetic field set up in the stator 22 results in a similar magnetic field reproduced in the stator 24. Means are provided to produce a modulated voltage in the rotor 16 of the synchro control transformer 18. To this end, a source (not shown) of alternating current (A.-C.) voltage of a predetermined frequency, for example 120 volts at 400 cycles per second (c. p. s.), is applied across the rotor 10 of the synchro control transformer 12. The magnetic field set up about the rotor 10 by this excitation will induce a voltage in the rotor 22, which, in turn, will cause current to flow through the stator 24 and thereby produce a magnetic field about the stator 24 similar to that about the stator 22. When the shaft A is rotated, as by the motor 14, the magnetic fields about the stators 12 and 24 will also rotate. The rotating magnetic field about the stator 24 will produce a modulated voltage across the rotor 16.

In accordance with the present invention, a modulated voltage will be set up across the rotor 16 of the synchro control transformer 18 when there is relative angular rotational displacement between the shaft A and the shaft B that increases in one direction with time. Under these conditions, the shaft A may be stationary and the shaft B may rotate in one direction; or the shaft B may be stationary and the shaft A may rotate in one direction. The null detector of the present invention will also operate when the shafts are rotated at different angular velocities with respect to each other.

Means are provided to obtain a sharp output pulse whenever the angular rotational displacement between the shafts A and B is 0°, that is 360° also. To this end, the rotor 16 is connected between the control grid and the cathode of a gas tube 28, such as a thyratron of the type 2D21. The rotor 16 may be connected in the last-mentioned circuit, as by slip rings 30, flexible wires or by any other suitable means known in the art. The cathode of the tube 28 is connected to a common connection and point of reference potential, such as ground, through a cathode resistor 32. The control grid of the tube 28 is also connected to the cathode through a diode 34, such as a germanium rectifier, in a manner to cause conventional current to flow from the grid to the cathode. The diode 34 serves to limit the positive grid-to-cathode voltage, and thereby functions to prevent the grid from drawing current when it tends to go positive. The diode 34 may be omitted without seriously affecting the operation of the null detector.

The same source of A. C. voltage that is applied across the rotor 10 of the synchro control transformer 12 is also applied as an operating voltage for the tube 28. To this end, the aforementioned A. C. voltage is applied to the anode of the tube 28 through a capacitor 36. Suitable operating voltage for the screen grid of the tube 28 is derived from a voltage divider comprising a resistor 38 and a potentiometer 40 connected across the A. C. voltage supply. The tap on the potentiometer 40 is connected to the screen grid for providing a suitable operating voltage thereto, and thereby controlling the firing time of the tube 28. A resistor 42 of relatively large resistance is connected in shunt with the capacitor 36 to permit the capacitor 36 to discharge slowly. It will be understood that the time constant of the circuit comprising the capacitor 36 and the resistor 42 is relatively much longer than the period of one cycle of the aforementioned A. C. voltage applied between the anode and the cathode of the tube 28.

The operation of the null detector, whereby a sharp output pulse is produced when the shaft A is at 0° angular rotational displacement with respect to shaft B, will now be described. The same A. C. voltage is applied across the rotor 10, for excitation thereof, as is applied as an operating voltage across the tube 28. This A. C. voltage may have the waveform 44, shown in Fig. 2. When there is relative angular rotational displacement between the shafts A and B, a modulated voltage of the same carrier frequency as the aforementioned A. C. voltage appears across the rotor 16. This modulated voltage may have the waveform 46, shown in Fig. 2. As the relative angular rotational displacement between the shafts A and B varies from 0° to 360°, it will be noted that the amplitude (or envelope) of the modulated A. C. voltage 46 passes through zero at 0° (360°) and 180°. The modulated A. C. voltage across the rotor 16, however, is in phase with the anode A. C. voltage on the tube 28 when the angular rotational displacement between the shafts A and B is between 0° and 180°. When the angular rotational displacement between the shafts A and B is between 180° and 360°, the A. C. voltage across the rotor 16 is out of phase with the anode voltage applied to the tube 28. Thus, the voltage on the grid, as clipped by the diode 34, will have the heavy line waveform 48a, shown in Fig. 2 when the angular rotational displacement between the shafts A and B is between 0° and 180°. With the proper voltage on the screen grid of the tube 28, as provided from the tap on the potentiometer 40, the tube 28 will fire when the grid voltage is substantially zero volts. Thus, the tube 28 acts as a rectifier of its A. C. operating voltage when the angular rotational displacement between the shafts A and B is between 0° and 180°. During the angular rotational displacement between the two shafts A and B from 180° to 360°, the clipped grid voltage, represented by the heavy line waveform 48b, in Fig. 2, causes the tube 28 to be cut off. The charge across the capacitor 36 is represented by the voltage waveform 50, in Fig. 2. Thus, it will be understood that when the tube 28 is conducting, the voltage across the capacitor 36 increases very rapidly to a steady state value, as when the angular rotational displacement between the shafts A and B is between 0° and 180°. Because of the relatively long time constant of the circuit comprising the capacitor 36 and the resistor 42, the waveform 50 tapers gradually from its steady state value to zero when the angular rotational displacement between the shafts A and B is between 180° and 360°. This gradual decrease in voltage across the capacitor 36 should take place over a duration of time equal to at least a few cycles of the aforementioned A. C. voltage. The capacitor 36 and the cathode resistor 32 form a differentiator circuit which functions to provide a sharp output pulse at the instant the tube 28 begins to conduct. This results in a sharp pulse across the cathode resistor 32 that may be applied to an indicator (not shown) from the cathode of the tube 28. This sharp pulse is shown as pulse 51, in Fig. 2, occurring when the angular rotational displacement between the shafts A and B is 0° (or 360°). Due to the relatively long time constant of the circuit comprising the capacitor 36 and the resistor 42, no output pulse is derived during an anti-null, as when the angular rotational displacement between the shafts A and B is 180°.

Thus, there has been shown and described a null detector for providing a sharp output pulse only when the angular rotational displacement between two shafts is 0°. When the null detector of the present invention is used in a search radar installation, a search antenna may be mounted on the shaft A and may be continuously rotated by the motor 14. The shaft B may be connected to a position indicator. If, for example, the shaft B is set to indicate a specific direction, such as north, an output pulse will be derived from the null detector every time the search antenna points directly north. The output pulse may be displayed on the face of an oscilloscope in a manner well known in the art.

What is claimed is:

1. A circuit comprising a gas tube having at least an anode, a control grid and a cathode, a capacitor having one end connected to said anode, a first resistor having one end connected to said cathode, means to apply a source of A.-C. voltage between the other ends of said capacitor and said first resistor, means to modulate said A.-C. voltage, means to apply said A.-C. voltage in a modulated form between said control grid and said cathode, a second resistor connected across said capacitor, and output means connected to said first resistor.

2. A circuit comprising a gas tube having at least an anode, a control grid and a cathode, a capacitor having one end connected to said anode, a first resistor having one end connected to said cathode, means to apply an A.-C. voltage between the other ends of said capacitor and said first resistor, means to modulate said A.-C. voltage, means to apply said A.-C. voltage in a modulated form between said control grid and said cathode, a second resistor connected across said capacitor, means connected to said cathode to obtain an output therefrom, and said second resistor and said capacitor comprising a circuit having a time constant longer than the time period of one cycle of said A.-C. voltage.

3. A circuit comprising a gas tube having at least an anode, a control grid and a cathode, a capacitor having one end connected to said anode, a first resistor having one end connected to said cathode, means to apply a source of A.-C. voltage between the other ends of said capacitor and said first resistor, means to modulate said A.-C. voltage, means to apply said A.-C. voltage in a modulated form between said control grid and said cathode, a second resistor connected across said capacitor, output means connected to said cathode, and a rectifier connected between said control grid and said cathode.

4. A circuit comprising a gas tube having at least an anode, a control grid and a cathode, a capacitor having one end connected to said anode, a first resistor having one end connected to said cathode, means to apply a source of A.-C. voltage between the other ends of said capacitor and said first resistor, a winding, means connecting said winding between said control grid and said cathode, means to modulate said A.-C. voltage, means to apply said modulated A.-C. voltage across said winding, a second resistor connected across said capacitor, and output means connected to said first resistor.

5. Apparatus for indicating when the angular rotational displacement of a first rotor of a first synchro control transformer is zero degrees with respect to a second rotor of a second synchro control transformer comprising means to apply an A.-C. voltage across said first rotor, said first and said second transformers each having a stator connected to each other, a gas tube having at least an anode, a control grid and a cathode, a capacitor, means connecting one end of said capacitor to said anode, a first resistor, means connecting one end of said first resistor to said cathode, means to apply said A.-C. voltage between the other ends of said capacitor and said first resistor, means connecting said second rotor between said control grid and said cathode, a second resistor connected across said capacitor, and output means connected to said first resistor.

6. Apparatus for indicating when the angular rotational displacement of a first rotor of a first synchro control transformer is zero degrees with respect to a second rotor of a second synchro control transformer comprising means to apply an A.-C. voltage across said first rotor, said first and said second transformers each having a stator connected to each other, a gas tube having at least an anode, a control grid and a cathode, a capacitor, means connecting one end of said capacitor to said anode, a first resistor, means connecting one end of said first resistor to said cathode, means to apply said A.-C. voltage between the other ends of said capacitor and said first resistor, means connecting said second rotor between said control grid and said cathode, a second resistor connected across said capacitor, output means connected to said first resistor, and a diode connected between said control grid and said cathode to cause current to flow from said control grid to said cathode.

7. Apparatus for indicating when the angular rotational displacement of a first rotor of a first synchro control transformer is zero degrees with respect to a second rotor of a second synchro control transformer comprising means to apply an A.-C. voltage across said first rotor, said first and said second tranformers each having a stator connected to each other, a gas tube having at least an anode, a control grid and a cathode, a capacitor, means connecting one end of said capacitor to said anode, a first resistor, means connecting one end of said first resistor to said cathode, means to apply said A.-C. voltage between the other ends of said capacitor and said first resistor, means connecting said second rotor between said control grid and said cathode, a second resistor connected across said capacitor, output means connected to said first resistor, and said capacitor and said second resistor comprising a circuit having a time constant longer than the period of time of one cycle of said A.-C. voltage.

8. Apparatus for indicating when the angular rotational displacement of a first rotor of a first synchro control transformer is zero degrees with respect to a second rotor of a second synchro control transformer comprising means to apply a source of A.-C. voltage across said first rotor, said first and said second transformers each having a stator connected to each other, a gas tube having an anode, a control grid, a screen grid and a cathode, a capacitor, means connecting one end of said capacitor to said anode, a first resistor, means connecting one end of said first resistor to said cathode, means to apply said source of A.-C. voltage between the other end of said capacitor and said first resistor, means connecting said second rotor between said control grid and said cathode, a second resistor connected across said capacitor, output means connected to said first resistor, a voltage divider connected between said source of A.-C. voltage, and means connecting said screen grid to a point on said voltage divider.

9. Apparatus for indicating when the angular rotational displacement between a first and a second shaft is zero degrees comprising a first synchro control transformer having a first rotor and a first stator, a second synchro control transformer having a second rotor and a second stator, means connecting said first and second stators to each other whereby a magnetic field set up in said first stator is reproduced in said second stator, said first shaft being fixed to said first rotor and rotatable therewith, said second shaft being fixed to said second rotor and rotatable therewith, means to connect a source of A.-C. voltage across said first rotor, a gas tube having at least an anode, a control grid and a cathode, means to connect said second rotor between said control grid and said cathode, a capacitor having one end connected to said anode, a first resistor having one end connected to said cathode, means to apply said source of A.-C. voltage between the other ends of said capacitor and said first resistor, a second resistor connected across said capacitor, and output means connected to said first resistor.

10. Apparatus for indicating when the angular rotational displacement between a first and a second shaft is zero degrees comprising a first synchro control transformer having a first rotor and a first stator, a second synchro control transformer having a second rotor and a second stator, means connecting said first and second stators to each other whereby a magnetic field set up in the first stator is reproduced in the second stator, said first shaft being fixed to said first rotor and rotatable therewith, said second shaft being fixed to said second rotor and rotatable therewith, means to connect a source of A.-C. voltage across said first rotor, a gas tube having at least an anode, a control grid, a screen grid and a cathode, means to connect said rotor between said control grid and said cathode, a capacitor having one end connected to said anode, a first resistor having one end connected to said cathode, means to apply said A.-C. voltage between the other ends of said capacitor and said first resistor, a second resistor connected across said capacitor, output means connected to said first resistor, and means connected to said screen grid to apply a portion of said A.-C. voltage thereto.

11. Apparatus for indicating when the angular rotational displacement between a first and a second shaft is zero degrees comprising a first synchro control transformer having a first rotor and a first stator, a second synchro control transformer having a second rotor and a second stator, means connecting said first and second stators to each other whereby a magnetic field set up in the first stator is reproduced in the second stator, said first shaft being fixed to said first rotor and rotatable therewith, said second shaft being fixed to said second rotor and rotatable therewith, means to connect a source of A.-C. voltage across said first rotor, a gas tube having at least an anode, a control grid and a cathode, means to connect said second rotor between said control grid and said cathode, a capacitor having one end connected to said anode, a first resistor having one end connected to said cathode, means to apply said A.-C. voltage between the other ends of said capacitor and said first resistor, a second resistor connected across said capacitor, output means connected to said first resistor, and a rectifier connected between said control grid and said cathode.

References Cited in the file of this patent
UNITED STATES PATENTS

| | | |
|---|---|---|
| 2,130,440 | Willis et al. | Sept. 20, 1938 |
| 2,474,275 | Oslund et al. | June 28, 1949 |
| 2,611,191 | Noxon et al. | Sept. 23, 1952 |